United States Patent
Barel

(10) Patent No.: US 11,775,086 B2
(45) Date of Patent: Oct. 3, 2023

(54) STYLUS NIB DESIGN AND ACCURACY IMPROVEMENT

(71) Applicant: Microsoft Technology Licensing, LLC, Redmond, WA (US)

(72) Inventor: Eliyahu Barel, Rosh HaAyin (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/640,314

(22) PCT Filed: Sep. 4, 2020

(86) PCT No.: PCT/US2020/049295
§ 371 (c)(1),
(2) Date: Mar. 3, 2022

(87) PCT Pub. No.: WO2021/046281
PCT Pub. Date: Mar. 11, 2021

(65) Prior Publication Data
US 2022/0334661 A1    Oct. 20, 2022

(30) Foreign Application Priority Data
Sep. 5, 2019  (EP) .................... 19195507

(51) Int. Cl.
G06F 3/0354    (2013.01)
G06F 3/044     (2006.01)
G06F 3/041     (2006.01)
G06F 3/038     (2013.01)

(52) U.S. Cl.
CPC ........ G06F 3/03546 (2013.01); G06F 3/0383 (2013.01); G06F 3/0441 (2019.05); G06F 3/0442 (2019.05); G06F 3/04162 (2019.05)

(58) Field of Classification Search
CPC .. G06F 3/0442; G06F 3/0441; G06F 3/04162; G06F 3/03545
USPC ........................................ 345/179
See application file for complete search history.

(56) References Cited

U.S. PATENT DOCUMENTS

| | | | |
|---|---|---|---|
| 8,536,471 B2 | 9/2013 | Stern et al. |
| 8,878,824 B2 | 11/2014 | Besperstov |
| 8,913,042 B2 | 12/2014 | Mercea et al. |
| 9,513,721 B2 | 12/2016 | Stern |
| 9,612,671 B1 | 4/2017 | Blaszczak et al. |
| 9,886,104 B2 | 2/2018 | Zeliff et al. |

(Continued)

FOREIGN PATENT DOCUMENTS

| CN | 209311996 U | * | 8/2019 |
| CN | 209311996 U | | 8/2019 |

OTHER PUBLICATIONS

"Extended European Search Report Issued in European Patent Application No. 19195507.9", dated Feb. 20, 2020, 8 Pages.

(Continued)

*Primary Examiner* — Koosha Sharifi-Tafreshi
(74) *Attorney, Agent, or Firm* — Barta, Jones & Foley, PLLC

(57) ABSTRACT

A stylus comprising a housing and a nib portion configured to be attached to the housing and to extend out from the housing, wherein the nib portion comprises at a tip area an integrated conductive tip electrode and at least one integrated conductive ring electrode surrounding the tip electrode at least partially and electrically isolated from the tip electrode.

20 Claims, 7 Drawing Sheets

(56) References Cited

U.S. PATENT DOCUMENTS

| | | | |
|---|---|---|---|
| 9,983,696 B2 | 5/2018 | Yoneoka et al. | |
| 10,025,401 B2 | 7/2018 | Bhandari et al. | |
| 10,048,778 B2 | 8/2018 | Mishalov et al. | |
| 10,168,804 B2 | 1/2019 | Zimmerman et al. | |
| 10,198,089 B2 | 2/2019 | Bhandari et al. | |
| 10,261,605 B2 | 4/2019 | Kremin et al. | |
| 10,296,089 B2 | 5/2019 | Peretz et al. | |
| 10,318,022 B2 | 6/2019 | Mishalov et al. | |
| 11,175,755 B1* | 11/2021 | Wong | G06F 3/017 |
| 2014/0168177 A1* | 6/2014 | Mkrtchyan | G06F 3/03545 |
| | | | 345/179 |
| 2016/0091991 A1* | 3/2016 | Zimmerman | H05K 3/284 |
| | | | 343/702 |
| 2017/0242501 A1* | 8/2017 | Tang | G06F 3/03545 |
| 2018/0088692 A1 | 3/2018 | Du | |
| 2018/0107293 A1 | 4/2018 | Yeh | |
| 2018/0129310 A1 | 5/2018 | Haran et al. | |
| 2021/0055828 A1* | 2/2021 | Miyamoto | G06F 3/0441 |

OTHER PUBLICATIONS

"International Search Report and Written Opinion Issued in PCT Application No. PCT/US20/049295", dated Nov. 24, 2020, 12 Pages.

* cited by examiner

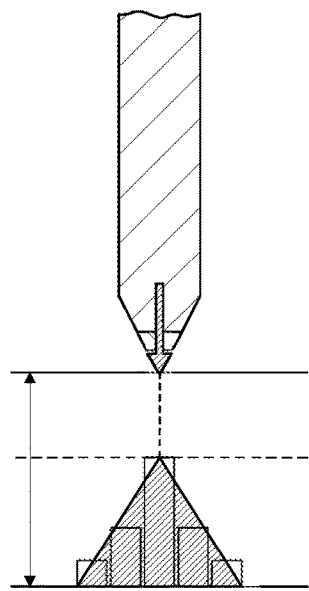
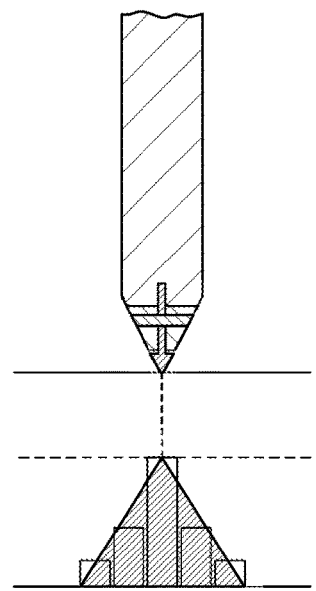
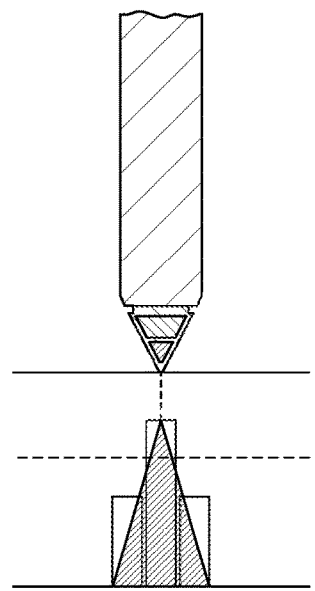
FIG. 7(a)   FIG. 7(b)   FIG. 7(c)
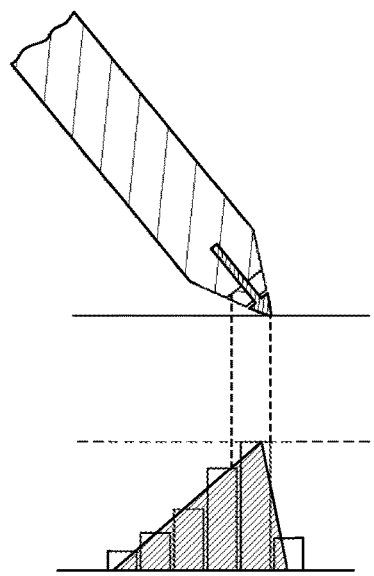
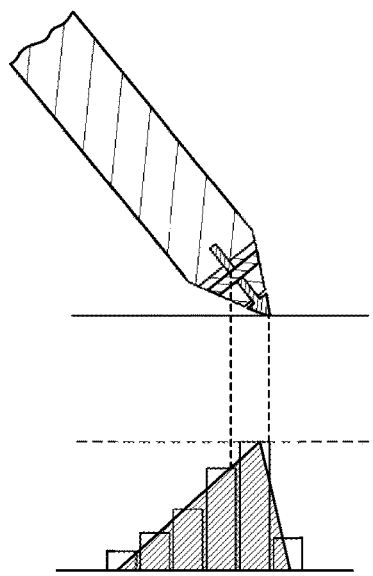
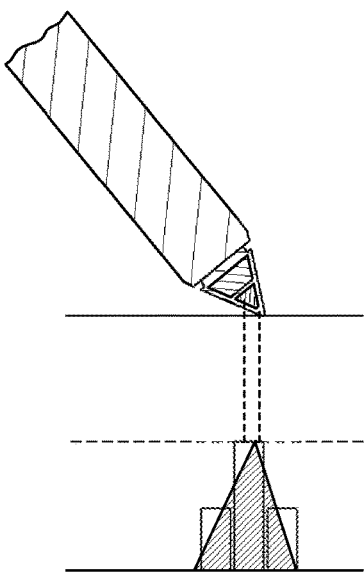
FIG. 8(a)   FIG. 8(b)   FIG. 8(c)

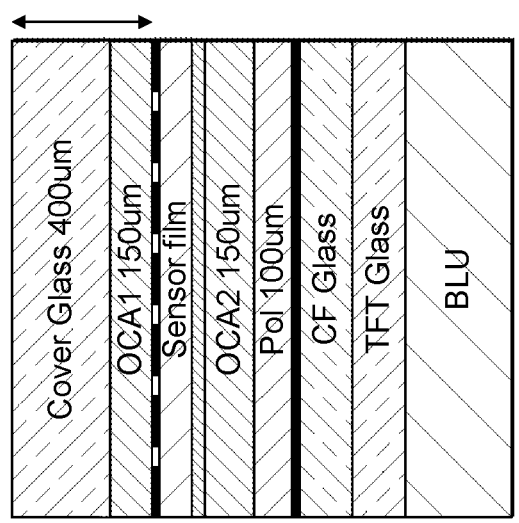
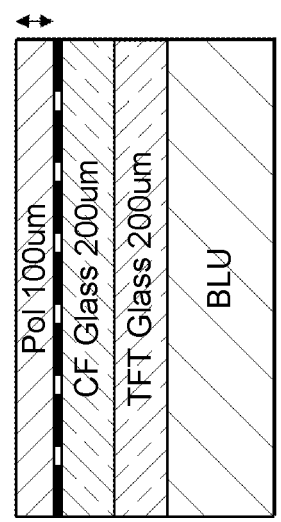
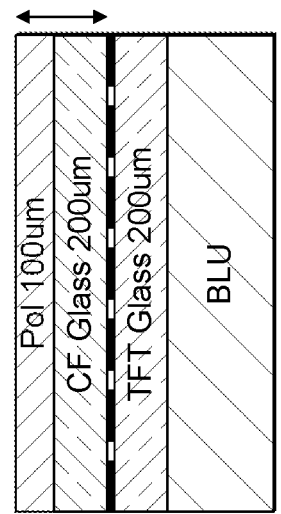
FIG. 10(a)
FIG. 10(b)
FIG. 10(c)

STYLUS NIB DESIGN AND ACCURACY IMPROVEMENT

BACKGROUND

Signal emitting pens or styluses (i.e. active styluses) are known in the art for use with a digitizer system. The digitizer system detects at least one position of the stylus based on a signal emitted and the detected position provides input to a computing device associated with the digitizer system. The detected position may then be interpreted as user commands. Often, the digitizer system is integrated with a display screen, e.g., to form a touch-sensitive display device. Positions of the stylus over the display screen are correlated with virtual information portrayed on the display screen. The signal emitted by the stylus may include additional information such as pressure applied on the writing tip and/or stylus identification. The information is decoded by the digitizer system.

The touch-sensitive display device may detect a touch event each time the stylus touches or comes into close proximity with a touch sensor of the touch-sensitive display device. A touch event may be interpreted by the touch-sensitive display device as a user input at a particular two- or three-dimensional location relative to the touch-sensitive display device.

Active styli typically include one or more electrodes. These electrodes can be driven with a particular excitation signal to influence electrical conditions on the touch sensor, and/or they can be configured to detect an excitation signal applied to display electrodes of the touch sensor.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

The disclosure in some embodiments relates to a stylus that can be used with a plurality of touch-enabled devices, e.g., a smart phone, a personal computer and a smart television and may include different versions or makes of a same type of device. In some example embodiments, a user may use the stylus to communicate with any one of the plurality of touch-enabled devices.

According to an aspect of some embodiments, the stylus may comprise a housing and a nib portion configured to be attached to the housing and to extend out from the housing, wherein the nib portion comprises an integrated conductive tip electrode and at least one integrated conductive ring electrode surrounding the tip electrode at least partially and electrically isolated from the tip electrode.

The tip and ring electrode(s) of the stylus can thus both be fixed or integrated in a single part of a molded nib portion made of plastic or another insulator material. This provides several advantages for better accuracy and/or positioning performance. A uniform nib design can be achieved (e.g. constant and fixed gap(s) between the tip and ring electrodes without mechanical freedom). Furthermore, tip and ring height of the stylus may easily be controlled at design level. This allows to provide an identity (ID) to each nib type. Moreover, different replaceable nib portions can be provided to allow for flexible sizes of the tip and ring electrodes, which are not limited by the size of the enclosure or housing of the nib portion. E.g., in some cases, a small ring and large tip electrode may be better depending on performance requirements. As a further advantage, the tip tail of the stylus can be covered by the ring electrode, so that no extra tail signal is generated. Also, the nib tail can be made wide and robust with connection elements (e.g. contact pins) for the ring and tip electrodes.

According to another aspect, a method comprises determining an electrode configuration of the nib portion of the stylus by measuring a predetermined parameter of the nib portion; and calibrating the stylus by adapting stylus settings to the determined electrode configuration of the attached nib portion.

Unless otherwise defined, all technical and/or scientific terms used herein have the same meaning as commonly understood by one of ordinary skill in the art. Although methods and materials similar or equivalent to those described herein can be used in practice or testing of embodiments of the disclosure, example methods and/or materials are described below. In addition, the materials, methods, and examples are illustrative only and are not intended to be necessarily limiting.

BRIEF DESCRIPTION OF THE DRAWINGS

To assist understanding of the present disclosure and to show how embodiments of such may be put into effect, reference is made, by way of example only, to the accompanying drawings in which:

FIGS. 7(a) to 7(c) are schematic illustrations of different stylus designs and their signal distributions in a vertical mode, FIGS. 8(a) to 8(c) are schematic illustrations of different stylus designs and their signal distributions in a tilted mode, FIGS. 10(a) to 10(c) are schematic cross-sectional views of respective stack designs of different display touch module structures without cover glass.

DETAILED DESCRIPTION

Figure 1:
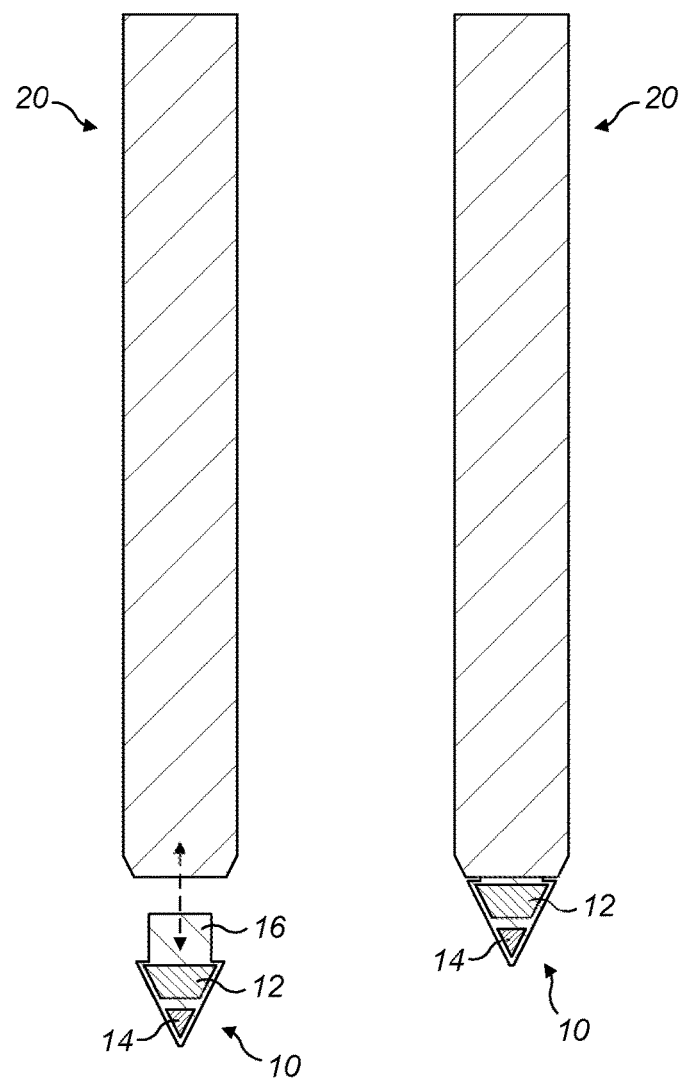
FIG. 1 is a schematic illustration of a stylus with replaceable nib portion in a removed state and an inserted state.

The present disclosure is directed to a new design of an active stylus having multiple electrodes in its tip and resulting handling procedures. The new design comprises the concept that both tip and ring electrodes of the stylus are fixedly integrated in a single part of a nib portion that may be made of a molded plastic or other insulator material. In some implementations, the active stylus may include one or more tip electrodes, as well as one or more ring electrode encircling the tip electrode(s). In general, the ring electrode(s) may have any suitable size and shape and may have any position on the nib portion. "Ring electrode" as used herein refers to any electrically conducting structure that encircles a stylus body at least partly. Interactions between stylus electrodes of the active stylus and display electrodes of a touch-sensitive display device result in a touch-sensitive display device receiving spatial capacitance (e.g. expressed by signal distribution) or other measurements of the active stylus. From these measurements, the touch-sensitive display device may calculate at least one of various parameters, such as a tip position of the active stylus relative to the display, a tilt parameter of the active stylus relative to the display, and a pressure parameter indicating a pressure applied to the nib portion of the active stylus.

In an example, the combination of the signals obtained from tip and ring electrodes may be used to determine the tilt of the active stylus in order to create tilt-dependent writing effects or to detect a smearing effect caused by the tilt of the stylus. Alternatively or additionally, the combination of signals obtained from the tip and ring electrodes may be used to correct the calculation of the tip position of the active stylus on a display screen.

In an example, the tilt parameter may include one or more angles specifying the orientation or attitude of the active stylus relative to a display screen of a touch-sensitive display device for which the active stylus is used as input device. For example, the tilt parameter may specify at what angle the active stylus intersects a plane perpendicular to the display, and/or at what angle the active stylus is "pointing" relative to a coordinate system defined on the surface of the display (i.e., tilt direction in a "north-south-east-west" sense over the plane of the display).

Additionally, further measurements between the tip and ring electrodes or other measurements at the molded nib portion can be used at the active stylus to determine an inserted type of nib portion (e.g. based on a nib identity (ID)) in order to adapt specific stylus settings to specific parameters of the nib portion.

Conventional stylus designs suffer accuracy performance due to their mechanical design. E.g., the tip tail is long and exposed and the tip electrode has mechanical freedom with respect a mechanically separated ring electrode or pen body. Moreover, the tip portion of the pen can move and deform under pressure due to the narrow inserted tip tail.

FIG. 1 is a schematic illustration of an active stylus with a single-unit nib portion 10 in a removed state (left part) and an inserted state (right part). The nib portion 10 comprises a tip electrode 14 and a ring electrode 12 which are fixedly integrated in the single part of the nib portion 10, e.g., based on a molded design of plastic or another non-conducting material (e.g. polyoxymethylene (POM) or thermoplastic polyurethane (TPU) or the like).

In an example indicated in the left part of FIG. 1, the nib portion 10 may be replaceable e.g. by using releasable connecting elements for connecting the tip and ring electrodes 14, 12 to electrical processing elements provided in a housing (enclosure) 20 of the stylus in order to exchange transmit and/or receive signals between the internal processing elements of the active stylus and the tip and ring electrodes 14, 12.

In an example, the nib portion 10 may comprise a tail portion 16 for inserting the nib portion 10 into an opening provide at the front portion of the housing 20 of the active stylus. Apparently, various (other) options for fixing the nib portion 10 at the housing 20 are available. E.g., a screwing connection may be achieved by providing respective threats at the tail portion 16 of the nib portion 10 and at the opening of the housing 20. As another option, the nib portion 10 may be fixed by a releasable clipping function or by an adhesive or by a magnetic attaching or inserting option.

The tip and ring electrodes 14, 12 are made of a conducting material (e.g. metal, graphite, polycarbon, conductive polymer, etc.). In an example, at least one of the tip and ring electrodes 14, 12 may be inserted during the molding process or printed on a molded part of the nib portion 10 after the molding process.

In an example, the outer diameter of the ring electrode 12 may range between 1 mm and 15 mm, while the size of the tip electrode 14 should not exceed the outer diameter of the ring electrode 12.

Due to the molded design of the nib portion 10, a constant and fixed gap can be kept between the tip and ring electrodes 14, 12. Furthermore, the height of the tip and ring electrodes 14, 12 can be well controlled on the design level and during production. Moreover, the diameter of the ring electrode 12 can be made very flexible, as it is no longer limited by the size of the housing 20 of the active stylus. Also, the tail portion 16 of the nib portion 10 towards the housing 20 can be made narrow and may be covered by the ring electrode 12, so that the generation of an extra tail can be prevented. In general, the nib portion 10 with the integrated tip and ring electrodes 14, 12 can be molded in any desirable shape as required by an intended implementation.

Figure 2:
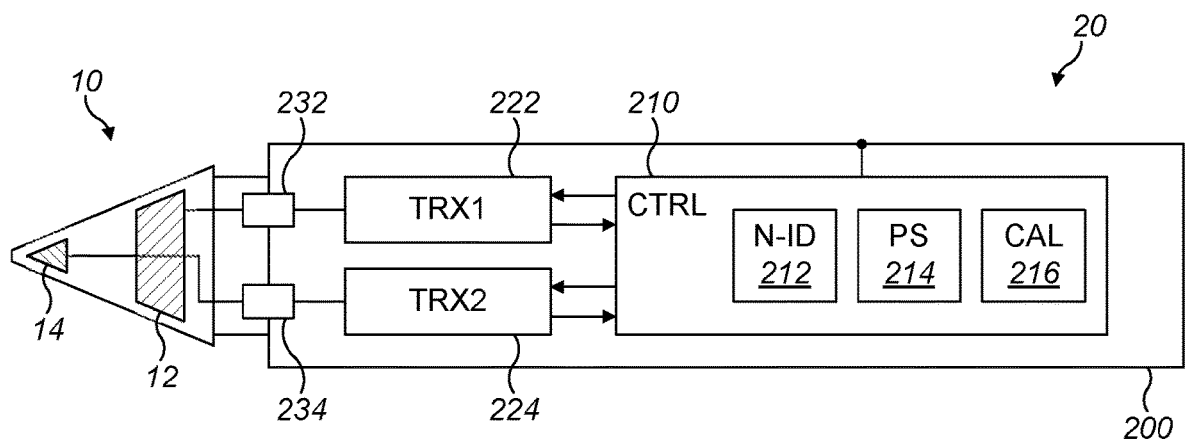
FIG. 2 is a schematic block diagram of a signal processing portion in a stylus with removable nib portion.

FIG. 2 is a schematic block diagram of a signal processing portion in an example of an active stylus with removable single-unit (e.g. molded) nib portion 10. The active stylus is usable with a touch-sensitive display device (not shown in FIG. 2) incorporating a touch sensor, wherein interactions between the tip and ring electrodes 14, 12 of the single unit nib portion 10 and the touch matrix result in control logic of the touch-sensitive display device receiving spatial capacitance measurements.

As can be gathered from FIG. 2, the tip and ring electrodes 14, 12 of the replaceable nib portion 10 are connected via respective releasable connecting elements 234, 232 to respective transceivers (TRX1, TRX2) 224, 222 of the signal processing portion provided in the housing 20 of the active stylus. The transceivers 224, 222 are adapted to receive respective signals via the tip and ring electrodes 14, 12 from the touch-sensitive display device and to transmit respective signals via the tip and ring electrodes 14, 12 to the touch-sensitive display device. These signals are processed (e.g. generated, coded, decoded, amplified, modulated, demodulated, etc.) by a controller 210 of the signal processing portion provided in the housing 20 of the active stylus.

In an example, the controller 210 may also be connected to a conductive layer or casing 200 of the housing 20 of the active stylus in order to use the conductive layer or casing 200 as an additional sensing electrode or reference electrode of the active stylus.

It will be appreciated that the nib portion 10 of active stylus may have any suitable number of electrodes, though active styli described herein will generally have a nib portion 10 with more than one electrode, e.g., the tip electrode 14 and at least one ring electrode 12, configured to receive and/or transmit an electric signal (i.e. current or voltage) when proximate to an electrode of the touch sensor of touch-sensitive display device.

In an example, respective analog-to-digital (A/D) converters (not shown in FIG. 2) may be operatively coupled between each of the transceivers 222, 224 and the controller 210 and configured to digitize analog signals received from the transceivers 222, 223 into digital data to facilitate subsequent processing at the controller 210.

The controller 210 may comprise a logic machine and a storage machine configured to hold instructions executable by the logic machine to perform various operations discussed herein. For example, the controller 210 may be configured to receive signals from the tip and ring electrodes 14, 12 and the optional sensing electrode of the conductive casing 200 of the housing 20. Further, the controller 210 may be configured to process digitized signals from A/D converter to perform the various operations discussed herein.

Via interactions between the tip and ring electrodes 14, 12 of the active stylus and display electrodes associated with a touch matrix of the touch sensor of the touch-sensitive display device, spatial capacitance measurements for each of the tip and ring electrodes 14, 12 can be localized to particular two-dimensional locations relative to the touch-sensitive display device. A control logic of the touch-sensitive display device may use these spatial capacitance measurements to calculate a tip position, a tilt parameter and other parameters of the active stylus. As the active stylus shown in FIG. 2 includes at least two integrated electrodes (i.e. the tip electrode 14 and the ring electrode 12) in the nib portion 10, the control logic of the touch-sensitive display device will receive at least two spatial capacitance measurements corresponding to the at least two electrodes of the active stylus.

As indicated above, a capacitance at a particular location relative to the touch matrix of the touch sensor of the touch-sensitive display device may be measured either when a display electrode detects a signal transmitted by a stylus electrode, or a stylus electrode detects a signal transmitted by a display electrode. Accordingly, localizing spatial capacitance measurements to two-dimensional positions may require only driving display electrodes, only driving stylus electrodes, or some combination of driving both display and stylus electrodes.

Active styli as described herein may therefore be configured to operate in one or both of a receive mode and a drive mode. Further, an active stylus may operate in a hybrid mode, in which one or more stylus electrodes are driven while one or more other stylus electrodes receive.

In some examples, the active stylus reports spatial capacitance measurements (e.g., timing, value of a row counter etc.) to the control logic of the touch-sensitive display device over some type of wireless link (e.g., a radio transmitter of the transceivers 222, 224). Accordingly, the control logic may receive the spatial capacitance measurements calculated by the active stylus via a communications interface of the touch-sensitive display device. Instead of or in addition to a radio link, spatial capacitance measurements may be transmitted electrostatically via excitation of stylus electrodes of the active stylus.

In one example, calculation of spatial capacitance measurements may be "frequency-divided" rather than "time-divided." Measuring spatial capacitance in this manner can allow for shorter touch-sensing time frames, and/or allow for more signal integration time during each touch-sensing time frame, potentially allowing for more accurate detection of touch input.

The tilt parameter of the active stylus may be calculated by identifying which spatial capacitance measurements correspond to which stylus electrode. The control logic at the touch-sensitive display device may identify a distance between a spatial capacitance measurement received for the ring electrode 12 and a spatial capacitance measurement received for the tip electrode 14. Based on this distance, the control logic may calculate a tilt parameter of the active stylus. Because the ring electrode 12 occupies a known position relative to the stylus tip, the control logic can make use of basic geometric relationships (e.g., trigonometric functions) in order to calculate the angle at which the active stylus intersects a plane parallel to the display. The control logic may optionally calculate the direction the stylus is "pointed" relative to a coordinate system of the touch-sensitive display device by calculating an angle of a line connecting the detected tip position of the active stylus to the spatial capacitance measurement corresponding to the ring electrode 12.

In an example, a stylus nib kit (e.g. for varied friction feelings, display technologies, applications etc.) can be provided e.g. as a box with a variety of nib portions 10 with different electrode configurations by which the active stylus can be adapted to different user applications and/or various product types or technologies of the touch-sensitive display device (such as out-cell technology with cover glass, in-cell technology with or without cover glass, on-cell technology with or without cover glass, etc.), as explained later in more detail. Based on the replaceable nib portion 10, the digitizer system with touch-sensitive display device can provide better experience and can be better adapted to user needs (e.g. by providing individual drawing or pointing algorithms, artistic drawing features, etc.).

Moreover, in an example, a tip front or nib ID can be provided in addition to a conventional stylus ID, so that the stylus can identify the used nib portion 10 and be adapted thereto. Although the touch-sensitive display device can detect a signal shape for the tip and ring electrodes based on a sensor arrangement provided on the touch screen, it needs to know the orientation (tilt) of the pen. However, to determine the orientation of the stylus, the configuration of the tip and ring electrodes 14, 12 of the currently used nib portion 10 is required. This can be derived at the display device if the nib ID is signalled by the stylus to the display device.

In an example, the controller 210 of the active stylus comprises a nib ID determination function (N-ID) 212 for determining the nib ID of an inserted nib portion 10. The nib ID determination function may be implemented as a software routine of the controller 210 or as a hardware function (e.g. an application specific integrated circuit (ASIC) or a field programmable gate array (FPGA)) connected to the controller 210.

In an example, the nib ID determination can be achieved by using a capacitance sensing functionality which may already be provided on the circuit board of the active stylus. The capacitance sensing functionality can be used by the nib ID determination function 212 to measure the capacitance between the tip electrode 14 and the ring electrode 12.

Size and configuration of the tip and ring electrodes 14, 12 are fixed by the molded design of the nib portion 10. Therefore, each available nib portion 10 has a characteristic capacitance between its tip and ring electrodes 14, 12 (e.g. small tip and large ring, small tip and small ring, large tip and small ring, etc.), which can be detected based in the capacitance measurement(s). The stylus controller can use this/these measurement result(s) to derive the nib ID and provide the nib ID together with stylus ID to the display device. Moreover, the controller 210 of the stylus system can use this nib ID determination function 212 to detect when a user replaces the nib portion 10 of the stylus.

Another option for determining the nib ID in the nib ID determination function 212 may be to measure an ohmic resistance between the tip electrode 14 and the ring electrode 12 and determine the nib ID based on change of the resistance e.g. in comparison with a reference value. Other electric parameters, such as inductance, impedance, crosstalk between tip electrode and ring electrode, crosstalk between tip/ring electrode 14, 12 and casing 200 or the like, may alternatively be used for determining the nib ID based on the electrode configuration of the nib portion 10.

A further option may be to determine the nib ID based on a mechanical shape or another mechanical property of the nib portion 10 or its tail portion 16 or by a magnetic field or a position of a magnetic part of the nib portion 10.

In an example, if the nib portion 10 has been replaced by a user or as initial procedure prior to first use of the active stylus, the controller 210 may initiate a calibration procedure by a calibration function (CAL) 216. The calibration function 216 may be implemented as a software routine of the controller 210 or as a hardware function (e.g. an application specific integrated circuit (ASIC) or a field programmable gate array (FPGA)) connected to the controller 210.

Figure 3:
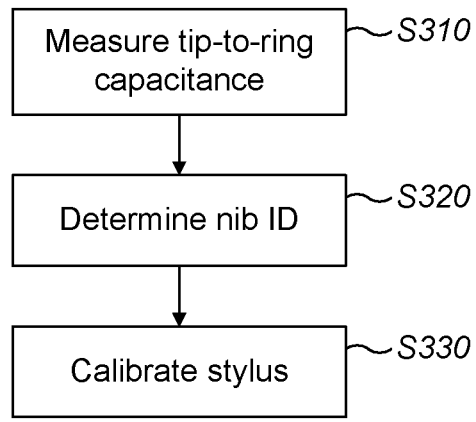
FIG. 3 is a schematic flow diagram of a calibration procedure after a nib replacement.

FIG. 3 is a schematic flow diagram of a calibration procedure after a nib replacement.

In step S310, the calibration function 216 initiates a measurement of the capacitance between the tip electrode 14 and the ring electrode 12 (or suitable electrical, physical or mechanical parameter) e.g. by the nib ID determination function 212. Then, in step S320, the nib ID is determined e.g. by the nib ID determination function 212 based on the measurement result(s) obtained in step S310. This determination may be based on an access to a look-up table or another other non-volatile memory provided in the active styled and accessible by the controller 210. The look-up table or memory stores nib IDs in association with corresponding values or value ranges of the coupling capacity. Finally, in step S330, the active stylus is calibrated by adapting the settings (e.g. at least one of signal magnitude, frequency range, signal phase, pulse type, signal type per tip and ring, etc.). to the electrode configuration of the attached nib portion 10. Thereby, the processing and signals used by the active stylus are modified for an optimized use of the attached nib portion 10.

In an example, the active stylus with the single-unit nib portion 10 may further provide a pressure sensing function (PS) 214 for sensing the pressure applied to the tip of the active stylus during a pointing or writing action. The determined pressure can be used e.g. for modifying the width or intensity of the signal detected by the touch-sensitive display device. Pressure sensing can be based on a variation of the distance between an electrode of the attached nib portion 10 and the housing 20. The coupling capacitance varies in dependence on the distance between an electrode of the attached nib portion 10 and the housing 20. Even very small variations of the distance can influence the coupling capacitance to a measurable amount.

Figure 4:
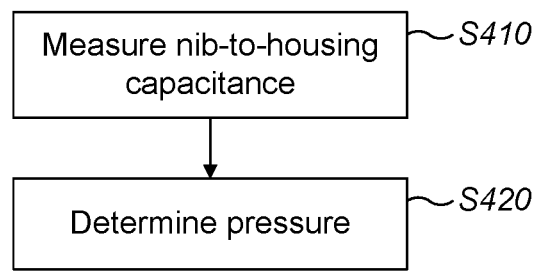
FIG. 4 is a schematic flow diagram of a pressure determination procedure.

FIG. 4 is a schematic flow diagram of a pressure determination procedure applied in a pressure sensing function (PS) 214 of the controller 210. The pressure sensing function 216 may be implemented as a software routine of the controller 210 or as a hardware function (e.g. an application specific integrated circuit (ASIC) or a field programmable gate array (FPGA)) connected to the controller 210.

In step S410, a coupling capacitance between the ring electrode 12 of the nib portion 10 and the conductive casing 200 of the housing 20 is measured. Then, in step S420, a pressure value is determined based on the measurement result(s) obtained in step S410. This determination may be based on an access to a look-up table or another other non-volatile memory provided in the active styled and accessible by the controller 210. The look-up table or memory stores pressure values in association with corresponding values or value ranges of the coupling capacity.

Figure 5A:
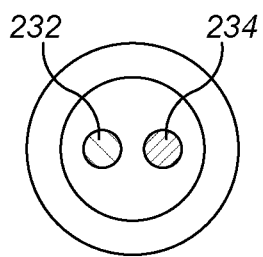
FIGS. 5(a) to 5(c) are schematic illustrations of different views of a replaceable nib portion.
Figure 5B:
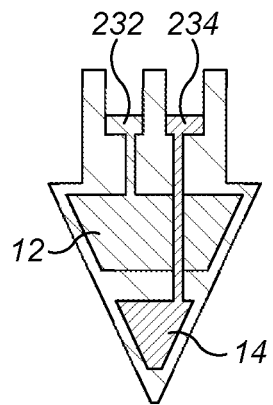
Figure 5C:
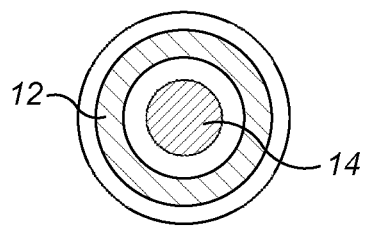

FIGS. 5(a) to 5(c) are schematic illustrations of a top view, side view and bottom view, respectively, of a replaceable nib portion. It is noted that although internal structures of the nib portion are shown in FIG. 5(b), the illustration is not to be interpreted as a cross-sectional view. It is just a side view which also indicates hidden internal structures. The top view of FIG. 5(a) shows an example of the connection elements 232, 234 as circular pads (tip pad, ring pad) in circular recess portion into which corresponding cylindrical pins with respective connection portions provided at the housing 20 of the active stylus can be inserted. Furthermore, as can be gathered from the side view of FIG. 5(b), the circular pads of the connection elements 232, 234 are electrically connected via a conductive path or wiring to the respective ring and tip electrodes 12, 14. Finally, the bottom view of FIG. 5(c) shows the tip electrode 14 and the surrounding ring electrode 12 from below, both integrated in the molded structure of the nib portion.

Figure 6A:
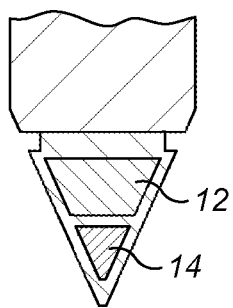
FIGS. 6(a) to 6(c) are schematic illustrations of different types of nib portions with different electrode sizes.
Figure 6B:
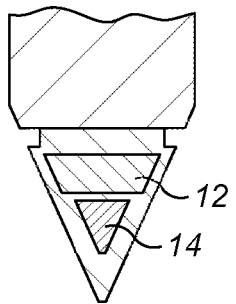
Figure 6C:
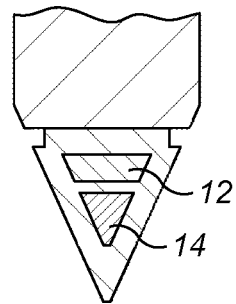

FIGS. 6(a) to 6(c) are schematic illustrations of different types of nib portions with different electrode sizes adapted for use with digitizer systems with different display device technologies.

The nib design shown in FIG. 6(a) comprises integrated tip and ring electrodes of a standard or normal shape and size. However, in some application cases, a smaller ring electrode 12 and a larger tip electrode 14 may be desirable depending on performance requirements. The design of the single-unit (molded) nib portion with integrated ring and tip electrodes 12, 14 allows provision of different nib molding shapes with different tip and ring electrode sizes for individual performance requirements. In the alternative nib design of FIG. 6(b), the tip electrode 14 is shifted up and the ring electrode 12 is smaller in the longitudinal direction of the active stylus. In the alternative nib design of FIG. 6(c), the tip electrode 14 is shifted up further and the ring electrode 12 is smaller in both longitudinal and lateral directions of the active stylus.

Of course, other modifications of the shapes of the tip and ring electrodes 14, 12 and also the nib portion may be provided depending on e.g. at least one of the desired applications and touch screen technologies.

Note that the above electrode and/or nib modifications lead to a change in specific measurable parameters (coupling capacitance, crosstalk, resistance, impedance, etc.) based on which the nib design and its related nib ID can be determined, as explained above.

In an example, the digitizer system may determine a suited nib molding shape (and its corresponding nib ID) based on the stylus ID. As an example, the stylus ID may be a combination of a housing ID and the nib ID.

Use of the proposed stylus with replaceable single-unit nib portions with different nib designs allows easy control of size, shape and/or height of the tip and ring electrodes 14, 12 at design level. This provides the advantage that the design of the tip electrode no longer depends on the shape of the housing of the active stylus and/or any process limitations. Moreover, a flexible ring diameter can be provided, that is not limited by the size of the housing and can be adapted to performance requirements.

Moreover, the tail of the tip electrode 14 can be made narrow and also covered by the ring electrode 12, so that no extra tail signal is generated. The tail of the nib portion with both ring and tip connector elements (e.g. contact pins or pads or the like) can be made wide and robust so that it cannot deform.

FIGS. 7(a) to 7(c) are schematic illustrations of different stylus designs and their signal distributions in a vertical operation mode of the active stylus.

More specifically, the diagrams in the lower part of FIGS. 7(a) to 7(c) present tip signal distributions (dress' shapes) for different stylus nib designs in the vertical operation mode of the active stylus in a direction parallel to the touch screen surface plane of the touch-sensitive display device, as received by a sensor matrix. FIG. 7(a) shows the signal distribution for a conventional nib design comprising a tip electrode with long and narrow tip tail and without ring electrode. Furthermore, FIG. 7(b) shows the signal distribution for a conventional nib design comprising a tip electrode with long and narrow tip tail and with a ring electrode surrounding the tip tail at about half of its total length. Finally, FIG. 7(c) shows the signal distribution for the proposed single-unit (molded) nib portion with integrated tip and ring electrodes.

As can be gathered from FIGS. 7(a) to 7(c), the signal distribution is wider for the conventional nib designs (FIGS. 7(a) and 7(b)) due to the fact that the tip tail of the tip electrode is exposed, while the proposed single-unit nib design with integrated tip and ring electrodes does not comprise any tip tail and therefore generates a narrow and very local signal distribution.

Thus, the ability to control level, shape and/or size of the tip and ring electrodes in the proposed single-unit nib design enables to achieve narrower and more local tip signals for improved positioning of the active stylus in digitizer systems.

FIGS. 8(a) to 8(c) are schematic illustrations of different stylus designs and their signal distributions in a tilted operation mode of the active stylus.

More specifically, the diagrams in the lower part of FIGS. 8(a) to 8(c) present tip signal distributions (dress' shapes) for different stylus nib designs in the tilted operation mode of the active stylus in a direction parallel to the touch screen surface plane of the touch-sensitive display device, as received by a sensor matrix. FIG. 8(a) shows the signal distribution for the conventional nib design comprising a tip electrode with long and narrow tip tail and without ring electrode. Furthermore, FIG. 8(b) shows the signal distribution for the conventional nib design comprising a tip electrode with long and narrow tip tail and with a ring electrode surrounding the tip tail at about half of its total length. Finally, FIG. 8(c) shows the signal distribution for the proposed single-unit (molded) nib portion with integrated tip and ring electrodes.

As can be gathered from FIGS. 8(a) to 8(c), the signal distribution is wider and strongly smears towards the tilt direction for the conventional nib designs of FIGS. 8(a) and 8(b), due to exposed tip tail. However, as the proposed nib design of FIG. 8(c) does not require any tip tail, the signal distribution is much narrow and very local with much less smear effect. Therefore, the ring electrode is no longer required for position correction and can solely be used for tilt-dependent drawing or positioning features such as wider drawing lines (like a pencil) and other options. Moreover, for artist users which use much higher tilt levels, the nip and/or electrode shape can be much better controlled.

Again, the ability to control level, shape and/or size of the tip and ring electrodes in the proposed single-unit nib design enables to achieve narrower and more local tip signals for improved positioning of the active stylus in digitizer systems.

In the following, the display technology of digitizer system is explained in more detail.

In some examples, the touch-sensitive display device of the digitizer system may be configured to receive input from input devices in contact with the display device and input devices not in contact with the display device (e.g., input devices that hover proximate to a surface of the display). "Touch input" as used herein refers to both types of input. In some examples, the display device may be configured to receive input from two or more sources simultaneously, in which case the display device may be referred to as a multi-touch display device.

The display device may be operatively coupled to an image source, which may be, for example, a computing device external to, or housed within, the display device. The image source may receive input from display device, process the input, and in response generate appropriate graphical output for the display device. In this way, the display device may provide a natural paradigm for interacting with a computing device that can respond appropriately to touch input.

Figure 9C:
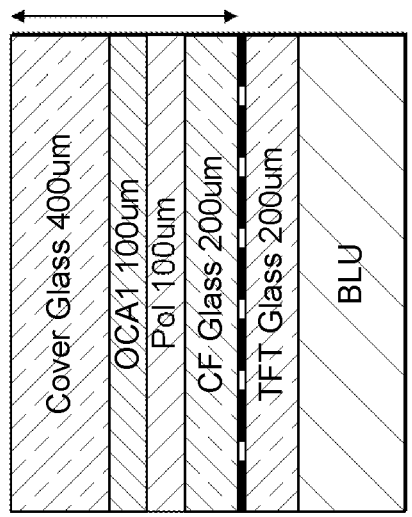
FIGS. 9(a) to 9(c) are schematic cross-sectional views of respective stack designs of different display touch module structures with cover glass.
Figure 9B:
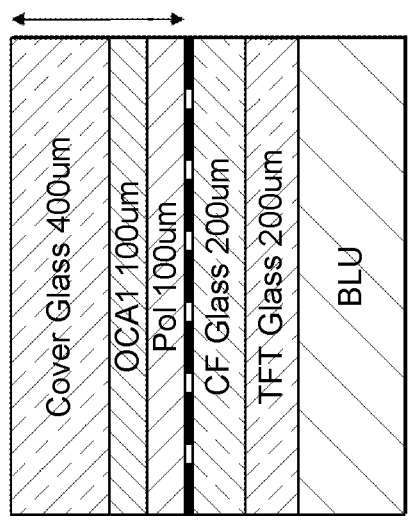
Figure 9A:
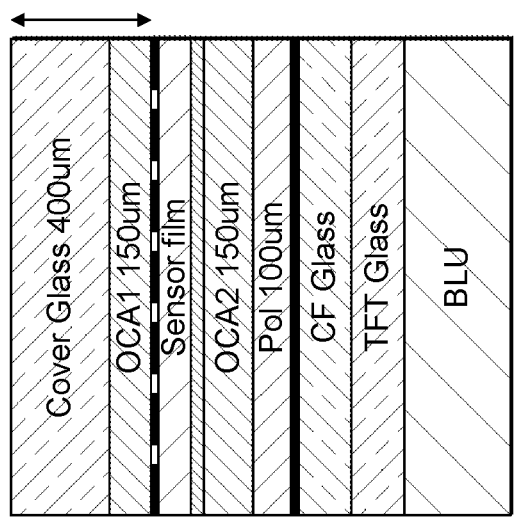

FIGS. 9(a) to 9(c) are schematic cross-sectional views of respective stack designs of different display touch module structures with cover glass.

FIG. 9(a) shows an optical stack of an out-cell structure of the touch-sensitive display device, which includes a plurality of components configured to enable the reception of a touch input and the generation and presentation of a graphical output. In the out-cell structure, a touch module is added onto a display module.

The optical stack of the out-cell structure may include a cover glass as an optically-clear touch sheet (with a thickness of e.g. 400 µm) having a top surface for receiving a touch input, a first optically-clear adhesive (OCA1) (with a thickness of e.g. 50 µm) for bonding a bottom surface of the cover glass to a top surface of a touch sensor (bold dashed line). The touch sensor may be comprised of any suitable material(s), such as glass, plastic, or another material and may be arranged on top of a sensor film. As used herein, "optically-clear adhesive" refers to a class of adhesives that transmit substantially all (e.g., about 99%) of incident visible light.

The touch sensor may comprise a touch matrix of display electrodes that form capacitors whose capacitances may be evaluated in detecting touch input. More specifically, the electrodes may be formed in two separate layers: a receive electrode layer and a transmit electrode layer positioned below the receive electrode layer. For example, receive and transmit electrode layers each may be formed on a respective dielectric substrate comprising materials including but not limited to glass, polyethylene terephthalate (PET), or cyclic olefin polymer (COP) film. The receive and transmit electrode layers may be bonded together by an optically-clear adhesive (not shown in FIG. 9(a)), which may be an acrylic pressure-sensitive adhesive film, for example.

The touch sensor configuration may be integrally formed as a single layer with electrodes disposed on opposite surfaces of an integral layer. Further, the touch sensor may alternatively be configured such that the transmit electrode layer is provided above, and bonded, via the optically-clear adhesive, to receive an electrode layer positioned therebelow. In general, the touch-sensitive display device may include a plurality of display electrodes whose capacitances may be evaluated in detecting a touch input, and these electrodes may be arranged or distributed in any suitable manner.

The touch sensor may be bonded, e.g. at a bottom surface of the transmit electrode layer, to the lower display stack via a second optically-clear adhesive (OCA2) with a thickness of e.g. 150 µm. The lower display stack may comprise a polarization layer (Pol) with a thickness of e.g. 100 µm followed by a color filter (CF) glass layer with a thickness of e.g. 200 µm, a thin-film transistor (TFT) glass layer with a thickness of e.g. 200 µm and a final backlight unit (BLU) as a light source for the touch-sensitive display device.

Furthermore, on-cell and in-cell touch technologies are provided to overcome the drawbacks of traditional out-cell touch technology with additional weight and thickness of the touch display panel and reduced light penetration rate.

FIG. 9(b) shows an optical stack of an on-cell structure of the touch-sensitive display device, where the touch sensor (bold dashed line) is located between the polarization layer and the color filter glass layer. Thus, the touch sensor is disposed on the color filter substrate to form a completed color filter substrate. The touch sensor may be disposed on a thin film which is bonded onto the upper one of the two substrate layers (i.e. the color filter and thin film transistor glass layers). Here, the thickness of the first optically-clear adhesive (OCA1) is 100 µm.

FIG. 9(c) shows an optical stack of an in-cell structure of the touch-sensitive display device, where the touch sensor (bold dashed line) is located between the color filter glass layer and the thin-film transistor glass layer. The in-cell technology is to dispose the sensor within the LCD cell structure to be integrated within the display unit, so that the display unit is provided with the ability of the touch panel. Therefore, the touch display panel does not need to be bonded with an additional touch panel and the assembly procedure can be simplified. Again, the thickness of the first optically-clear adhesive (OCA1) is 100 µm here.

As can be gathered from FIGS. 9(a) to 9(c), the distance between the surface of the touch-sensitive display device and the touch sensor (e.g. touch antennas) varies depending on the display technology. In the out-cell structure, the distance is at least 450 µm, while it is at least 600 µm in the on-cell structure and at least 800 µm in the in-cell structure, as indicated by the arrow to the right of the optical stacks.

However, it is to be noted that the on-cell and in-cell structures can work also without cover glass, while the polarization layer (polarizer) acts as interactive surface between the touch-sensitive display and the active stylus.

FIGS. 10(a) to 10(c) are schematic cross-sectional views of respective stack designs of the different display touch module structures, where the on-cell and in-cell structures are without cover glass. Thus, the cover glass and the first optically-clear adhesive are removed in FIGS. 10(b) and 10(c) so that the distances of the on-cell and in-cell structures are reduced by 500 µm to 100 µm for the on-cell structure and 300 µm for the in-cell structure.

The stack designs of FIGS. 10(b) and 10(c) are beneficial in that costs, thickness and weight can be reduced. The arrows in FIGS. 10(a) to 10(c) show the distance from the display surface to touch sensor. However, the signal distribution (dress shape) depends on the distance from the tip electrode to the touch sensor. A higher distance leads to an increased distribution on neighbor antennas of the touch sensor and thereby to an improved stylus accuracy, since the signals of neighboring antennas of the touch sensor are used to improve reception quality. The reduced distance must be compensated for on-cell and in-cell structures by the controller of conventional styli.

FIGS. 11(a) to 11(d) are schematic illustrations of respective signal distributions in the vertical mode for different display technologies. The signal distribution of FIG. 11(a) relates to a case where a conventional stylus with separate tip electrode with tip tail and separate ring electrode which surrounds the tip tail is used with an out-cell display technology, while FIG. 11(b) relates to an on-cell or in-cell display technology with glass cover and FIG. 11(c) relates to an on-cell or in-cell display technology without glass cover and corresponding reduced distance. Finally, the signal distribution of FIG. 11(d) relates to a case where the proposed stylus with single-unit nib portion and integrated tip and ring electrodes without tip tail is used with an on-cell or in-cell display technology without glass cover.

Figure 11A:
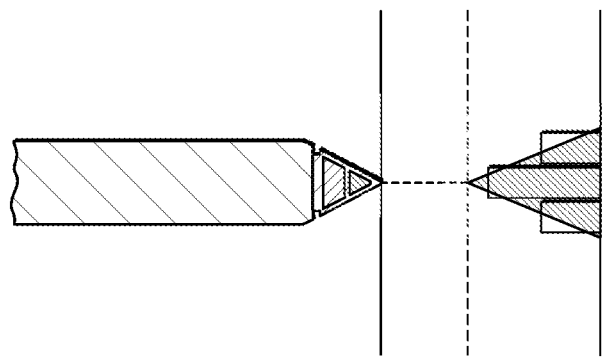
FIGS. 11(a) to 11(d) are schematic illustrations of respective signal distributions in the vertical mode for different display technologies.
Figure 11B:
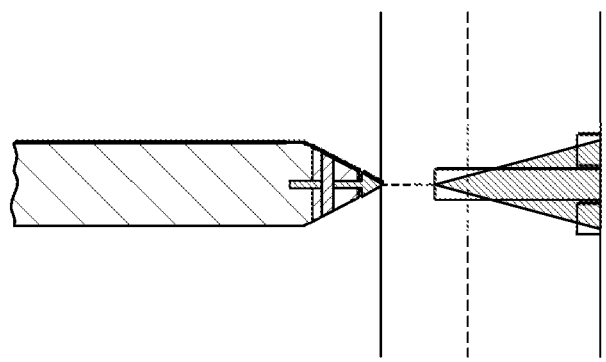
Figure 11C:
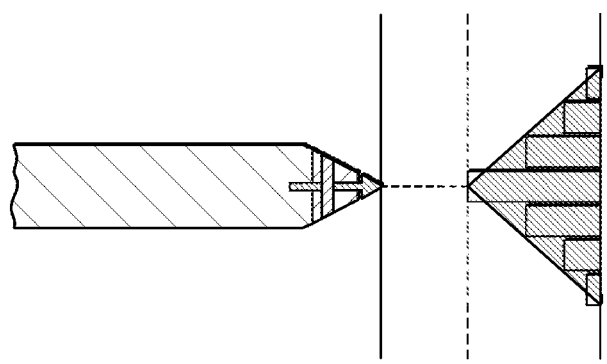

As can be gathered from FIGS. 11(a) to 11(c), the signal distribution is wider for the on-cell/in-cell display technology with cover glass and the signal level at the centre of the distribution is slightly lower, while the signal level at the centre of the distribution is much higher and the distribution is much narrower for the on-cell/in-cell display technology without cover glass (which is not good for stylus positioning).

Figure 11D:
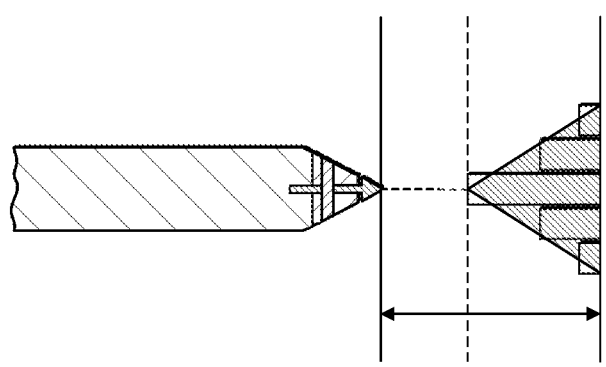

However, as can be gathered from FIG. 11(d), the single-unit nib portion of the proposed stylus can be adapted to the reduced distance of the on-cell/in-cell display technology without cover glass by using a nib portion with raised tip and ring electrodes (as shown for example in FIGS. 6(b) and 6(c). The capability to control shape, level and size of the tip and ring electrodes in the nib portion enables to achieve the required tip signal distribution for improved positioning capabilities.

Due to the fact that different nib portions with different electrode configurations can be provided, the distance between tip and ring electrodes and the antenna of the touch sensor can be adjusted individually based on the used display technology to provide better signal distribution and better accuracy.

It will be appreciated that the above embodiments have been described by way of example only.

More generally, according to one aspect disclosed herein, there is provided a stylus comprising a housing and a nib portion configured to be attached to the housing and to extend out from the housing, wherein the nib portion comprises at a tip area an integrated conductive tip electrode and at least one integrated conductive ring electrode surrounding the tip electrode at least partially and electrically isolated from the tip electrode.

In embodiments, the nib portion may comprise respective connecting elements for electrically connecting the integrated tip and ring electrodes to signal processing circuits arranged in the housing.

In embodiments, the nib portion may be releasably attachable to the housing.

In embodiments, the signal processing circuits may comprise a controller adapted to determine an electrode configuration of the nib portion by measuring a predetermined parameter of the nib portion.

In embodiments, the electrode configuration of the nib portion may be identified by a nib identity (ID) stored in the stylus or in a touch-sensitive display device in association with a corresponding range or value of the predetermined parameter. If the nib ID is stored in the display device, the electrode configuration may be communicated from the display device to the stylus.

In embodiments, the predetermined parameter may be selected from a capacitance between the tip and ring electrodes, a crosstalk between the tip and ring electrodes, and a resistance between the tip and ring electrodes.

In embodiments, the controller may be adapted to determine a pressure applied to a tip of the nib portion by measuring a coupling between the ring electrode and a conductive casing of the housing.

In embodiments, the controller may be adapted to transmit the nib identity to a touch-sensitive display device for which the stylus is used as input device.

In embodiments, the controller may be adapted to calibrate the stylus by adapting stylus settings to the determined electrode configuration of the attached nib portion.

In embodiments, the stylus may comprise a plurality of replaceable nib portions with different electrode configurations for different applications.

In embodiments, the electrode configurations may differ in at least one of shape, size and location of the tip and ring electrodes within the nib portion.

According to another aspect disclosed herein, there is provided a nib portion with integrated tip and ring electrodes for use in a stylus of the above aspect and its embodiments.

In embodiments, the nib portion may be made of a molded insulation material and the ring electrode may be printed on the molded insulation material. In an example, the tip and ring electrodes may be implemented as integrated parts of the nib portion, that are arranged deep inside the molded insulation material during the molding process or printed internally.

According to another aspect disclosed herein, there is provided a method comprising: determining an electrode configuration of a nib portion of a stylus by measuring a predetermined parameter of the nib portion; and calibrating the stylus by adapting stylus settings to the determined electrode configuration of the attached nib portion.

According to another aspect disclosed herein, there is provided a computer program embodied on computer-readable storage and comprising code configured so as when run on one or more processors to perform the method of any embodiment disclosed herein.

Other variants and applications of the disclosed techniques may become apparent to a person skilled in the art once given the present disclosure. The scope of the present disclosure is not limited by the above-described embodiments but only by the accompanying claims.

The invention claimed is:

1. A stylus comprising:
a housing; and
a single-unit nib portion configured to be attached to the housing and to extend out from the housing,
wherein the nib portion comprises a conductive tip electrode and a conductive ring electrode at least partially surrounding the tip electrode and electrically isolated from the tip electrode, and
wherein the tip electrode and the ring electrode are integrated into a molded structure of the nib portion.

2. The stylus of claim 1, wherein the nib portion is releasably attachable to the housing.

3. The stylus of claim 1, wherein the nib portion comprises respective connecting elements for electrically connecting the tip and ring electrodes to signal processing circuits arranged in the housing.

4. The stylus of claim 3, wherein the signal processing circuits comprise a controller adapted to determine an electrode configuration of the nib portion by measuring a parameter of the nib portion.

5. The stylus of claim 4, wherein the measured parameter is selected from one or more of: a capacitance between the tip and ring electrodes, a crosstalk between the tip and ring electrodes, a resistance between the tip and ring electrodes.

6. The stylus of claim 1, wherein a controller is adapted to determine a pressure applied to a tip of the nib portion by measuring a coupling between the ring electrode and a conductive casing of the housing.

7. The stylus of claim 1, wherein a controller is adapted to calibrate the stylus by adapting stylus settings to a determined electrode configuration of the nib portion.

8. The stylus of claim 1, wherein an electrode configuration of the nib portion is identified by a nib identity associated with a corresponding range or value of a measured parameter of the nib portion.

9. The stylus of claim 8, wherein a controller is adapted to transmit the nib identity to a touch-sensitive display device for which the stylus is used as input device.

10. The stylus of claim 1, wherein the stylus comprises a plurality of replaceable nib portions with different electrode configurations for different applications.

11. The stylus of claim 10, wherein the electrode configurations differ in one or more of: shape, size, location of the tip and ring electrodes within the nib portion.

12. A nib portion with integrated tip and ring electrodes for use in a stylus of claim 1.

13. The stylus of claim 1, wherein at least one of the tip electrode or the ring electrode is printed on the molded structure of the nib portion.

14. A method comprising:
determining an electrode configuration of a tip electrode and a ring electrode of a nib portion of a stylus;
determining a pressure applied to a tip of the nib portion using a measured coupling between the ring electrode and a conductive casing of a housing attached to the nib portion; and
calibrating the stylus including adapting a stylus setting to the determined electrode configuration.

15. The method of claim 14, wherein the electrode configuration is identified by a nib identity associated with a corresponding range or value of a measured parameter of the nib portion.

16. The method of claim 15, further comprising transmitting the nib identity to a touch-sensitive display device for which the stylus is used as input device.

17. The method of claim 14, wherein a measured parameter of the nib portion is selected from one or more of: a capacitance between the tip and ring electrodes, a crosstalk between the tip and ring electrodes, a resistance between the tip and ring electrodes.

18. A non-transitory computer readable storage machine comprising a computer program comprising code configured so as when run on a processor to perform a method comprising:
determining an electrode configuration of a tip electrode and a ring electrode of a nib portion of a stylus using a measured parameter of the nib portion selected from one or more of:
a capacitance between the tip and ring electrodes, a crosstalk between the tip and ring electrodes, a resistance between the tip and ring electrodes; and
calibrating the stylus including adapting a stylus setting to the determined electrode configuration.

19. The stylus of claim 1, wherein at least one of the tip electrode or the ring electrode is inserted into the molded structure of the nib portion during a molding process.

20. The non-transitory computer readable storage machine of claim 18, wherein the electrode configuration is identified by a nib identity associated with a corresponding range or value of the measured parameter.

\* \* \* \* \*